United States Patent
Ho

(10) Patent No.: US 11,472,144 B1
(45) Date of Patent: Oct. 18, 2022

(54) PLASTIC MATERIAL CRUSHING AND COMPACTING STRUCTURE

(71) Applicant: OXTI CORPORATION, New Taipei (TW)

(72) Inventor: Chih-Feng Ho, New Taipei (TW)

(73) Assignee: OXTI CORPORATION, New Taipei (TW)

( * ) Notice: Subject to any disclaimer, the term of this patent is extended or adjusted under 35 U.S.C. 154(b) by 0 days.

(21) Appl. No.: 17/335,031

(22) Filed: May 31, 2021

(51) Int. Cl.
| | |
|---|---|
| *B30B 15/06* | (2006.01) |
| *B30B 11/02* | (2006.01) |
| *B09B 3/00* | (2022.01) |
| *B30B 7/00* | (2006.01) |
| *B30B 9/32* | (2006.01) |

(52) U.S. Cl.
CPC .............. *B30B 11/027* (2013.01); *B09B 3/00* (2013.01); *B30B 7/00* (2013.01); *B30B 9/321* (2013.01); *B30B 15/062* (2013.01)

(58) Field of Classification Search
CPC .. B30B 3/00; B30B 7/00; B30B 9/305; B30B 9/3021; B30B 9/321; B30B 9/325; B30B 9/326; B30B 15/062; B30B 15/06; B30B 15/30; B02C 18/007; B02C 2018/0061; B02C 19/0093; B29B 17/00; B29B 17/0026
See application file for complete search history.

(56) References Cited

U.S. PATENT DOCUMENTS

| | | | | |
|---|---|---|---|---|
| 7,150,422 | B2 * | 12/2006 | Wang | B30B 9/3021 |
| | | | | 241/101.2 |
| 7,762,486 | B2 * | 7/2010 | Mussig | B30B 1/006 |
| | | | | 241/101.2 |
| 8,087,599 | B2 * | 1/2012 | Chen | B02C 18/0007 |
| | | | | 241/37.5 |
| 2015/0298415 | A1 * | 10/2015 | Schwelling | B30B 3/04 |
| | | | | 100/176 |

FOREIGN PATENT DOCUMENTS

CN 112403636 A * 2/2021 ............. B02C 18/14

* cited by examiner

*Primary Examiner* — Jimmy T Nguyen
(74) *Attorney, Agent, or Firm* — Leong C. Lei

(57) ABSTRACT

A plastic material crushing and compacting structure, including: a barrel, a upper side thereof configured with an input hole, and an inside thereof a driving device, an inside of the driving device a wireless transceiver module; a pair of clamping seats, configured below the input hole, and used to clamp an input plastic material item (e.g. plastic bottle, paute, etc.) to prevent the plastic material item from ejecting; a crushing device, configured below the pair of clamping seats and used to crush the input plastic material item, and provided with crushing device driver; and a telescopic push rod, configured below the driving device and moved vertically, a bottom of the telescopic push rod provided with a compressing face, several strip supports configured on the compressing face, and a gap arranged between each two adjacent strip supports, each of the gaps is the same size or not the same size.

4 Claims, 6 Drawing Sheets

PLASTIC MATERIAL CRUSHING AND COMPACTING STRUCTURE

(a) TECHNICAL FIELD OF THE INVENTION

The present invention relates to a crushing structure, and more particularly to a plastic material crushing and compacting structure.

(b) DESCRIPTION OF THE PRIOR ART

A general paper shredding structure, as Taiwan Patent No. M536095 shows, starts a paper shredding device by placing paper into the paper feed slot, and the fed paper is shredded and dropped into the accommodating slot.

The above paper shredding structure can shred and collect paper through the paper shredding device, and the shredded paper is removed after the paper can no longer be placed in. However, the volume occupied by the shredded paper has no way to be reduced effectively, and the currently existing shredding structures do not have an effective notification method to assist in cleaning-up.

SUMMARY OF THE INVENTION

To overcome the above disadvantages, the present invention proposes a plastic material crushing and compacting structure, including: a barrel, a upper side thereof configured with an input hole, and an inside thereof a driving device, an inside of the driving device a wireless transceiver module; a pair of clamping seats, configured below the input hole, and used to clamp an input plastic material item (e.g. plastic bottle, paute, etc.) to prevent the plastic material item from ejecting; a crushing device, configured below the pair of clamping seats and used to crush the input plastic material item, and provided with crushing device driver; and a telescopic push rod, configured below the driving device and moved vertically, a bottom of the telescopic push rod provided with a compressing face, several strip supports configured on the compressing face, and a gap arranged between each two adjacent strip supports, each of the gaps may be the same size or not the same size.

Preferably, the driving devices inside the barrel are paired and synchronized, allowing the telescopic push rods to apply force more uniformly upon the compression of the compressing face, thereby achieving a better compression effect.

The plastic material item is clamped by the pair of clamping seats after input into the barrel through the input hole so as to prevent the plastic material item from ejecting. Thereafter, the plastic material item drops downward after crushed by the crushing device. With the compressing face on the bottom of the telescopic push rod provided with several strip supports and the gap arranged between each two adjacent strip supports, the crushed plastic material item can drop downward to the bottom of the barrel. Next, the driving device is caused to push the telescopic push rod to make the compressing face of the telescopic push rod compress the crushed plastic material items on the bottom of the barrel 1, thereby allowing the present invention to achieve the effects of crushing and compressing to reduce the volume occupied by the crushed plastic material items. Finally, when the driving device cannot carry out the compression any more, a notification will be sent to a smart device (e.g., smart phone, APP, computer, etc.) through the wireless transceiver module inside the driving device to notify recycling, thereby allowing the present invention to further achieve a notification effect.

Furthermore, the present invention can upload the relevant data such as the removal time and frequency of the plastic material items crushed into a full barrel to the background, thereby allowing a person with relevant authority to use a smart device such as smart phone, APP or computer to connect to the background on the Internet to receive or view relevant message data and other information in a unspecified location, which allows the present invention to have the effect of accessing statistics and analysis through remote network.

DETAILED DESCRIPTION OF THE PREFERRED EMBODIMENTS

Figure 1:
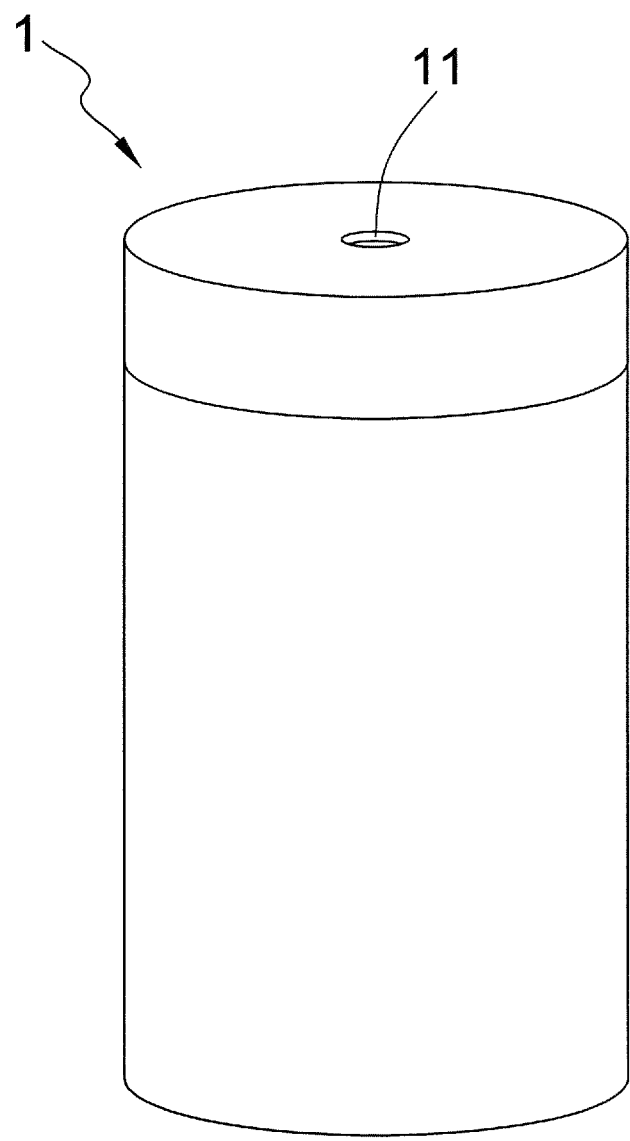
FIG. 1 is a perspective view of the present invention.
Figure 2:
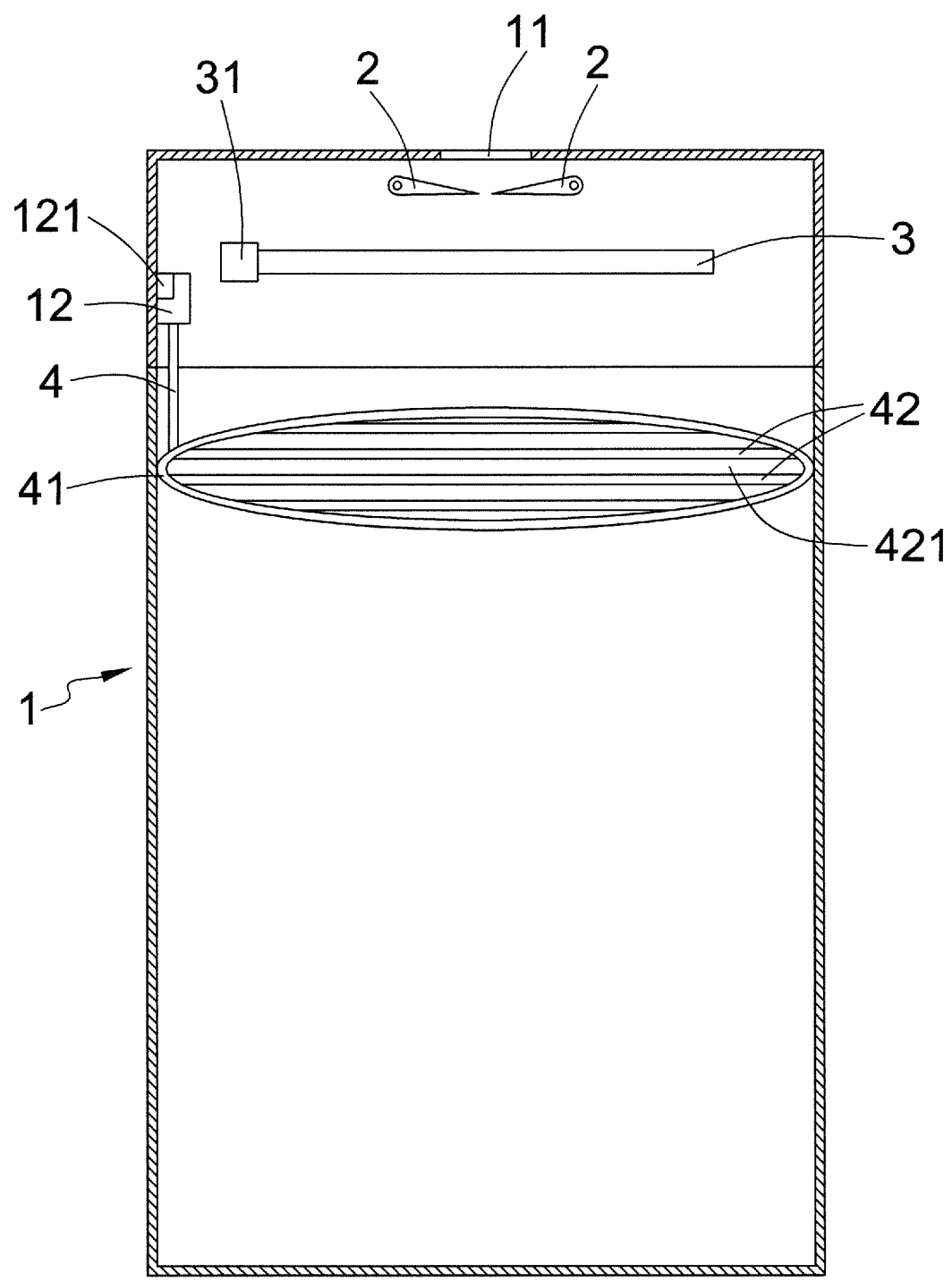
FIG. 2 is schematic view of the inside of the present invention.

Referring to FIGS. 1 and 2, a plastic material crushing and compacting structure includes a barrel 1, a pair of clamping seats 2, crushing device 3, and a telescopic push rod 4.

An input hole 11 is configured on the upper side of the barrel 1, and a driving device 12 inside which a wireless transceiver module 121 is provided with is configured inside the barrel 1.

The pair of clamping seats 2 are configured below the input hole 11, and used to clamp an input plastic material item A (e.g., plastic bottle, paute (PET) bottle, etc.) to prevent it from ejecting.

The crushing device 3 is configured below the pair of clamping seats 2 and used to crush the input plastic material item A; the crushing device 3 is provided with a crushing device driver 31.

The telescopic push rod 4 is configured below the driving device 12 and moved vertically; the bottom of the telescopic push rod 4 is provided with a compressing face 41, on which several strip support 42 is configured, and a gap 421 is arranged between each two adjacent strip supports, and each of the gaps may be the same size or not the same size.

Figure 6:
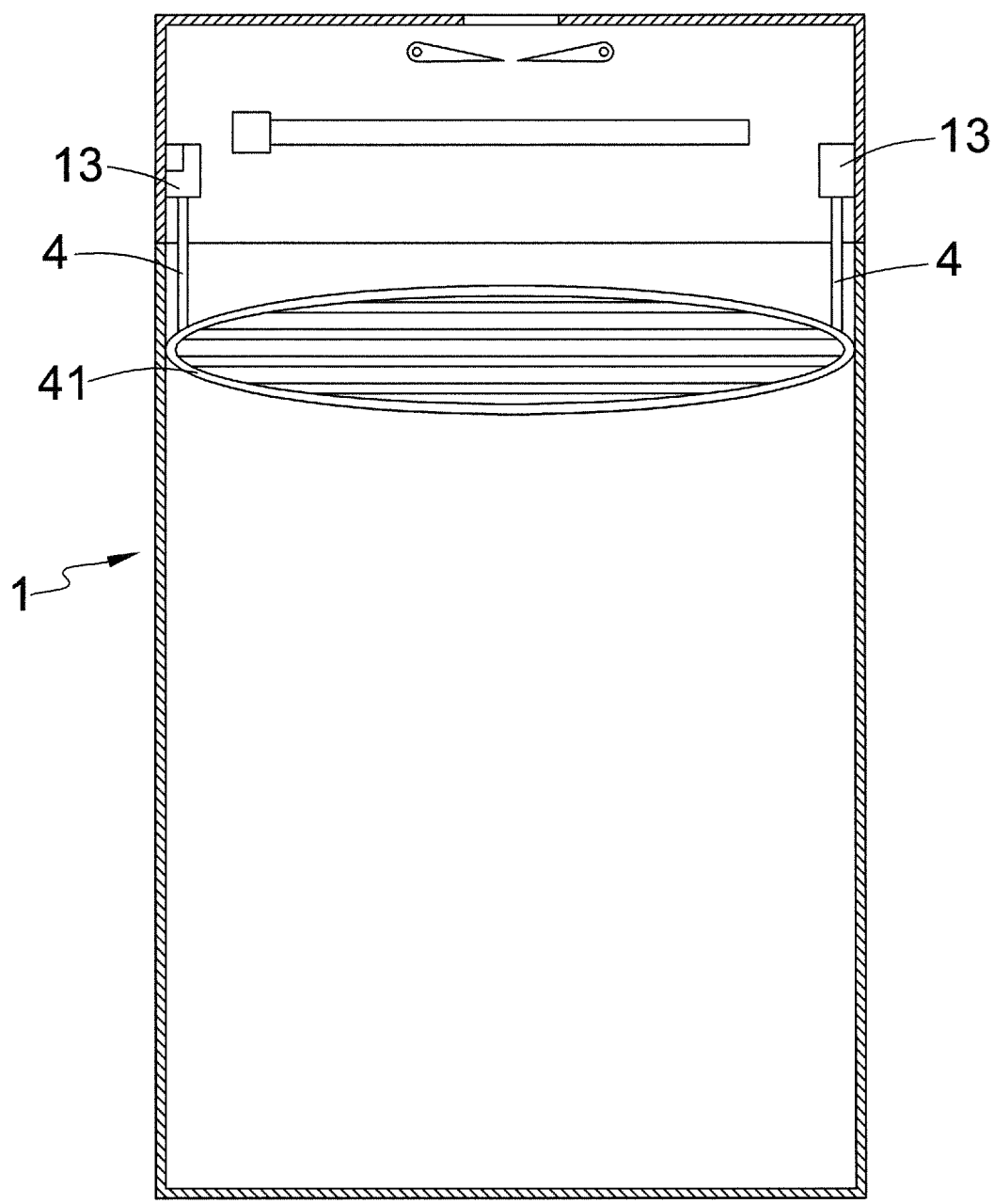
FIG. 6 shows paired and synchronized driving devices.

Referring to FIG. 6, a pair of synchronous driving devices, preferably, configured inside the barrel 1, allowing the telescopic push rods 4 to apply force more uniformly upon the compression of the compressing face 41, which can achieve a better compression effect.

Figure 3:
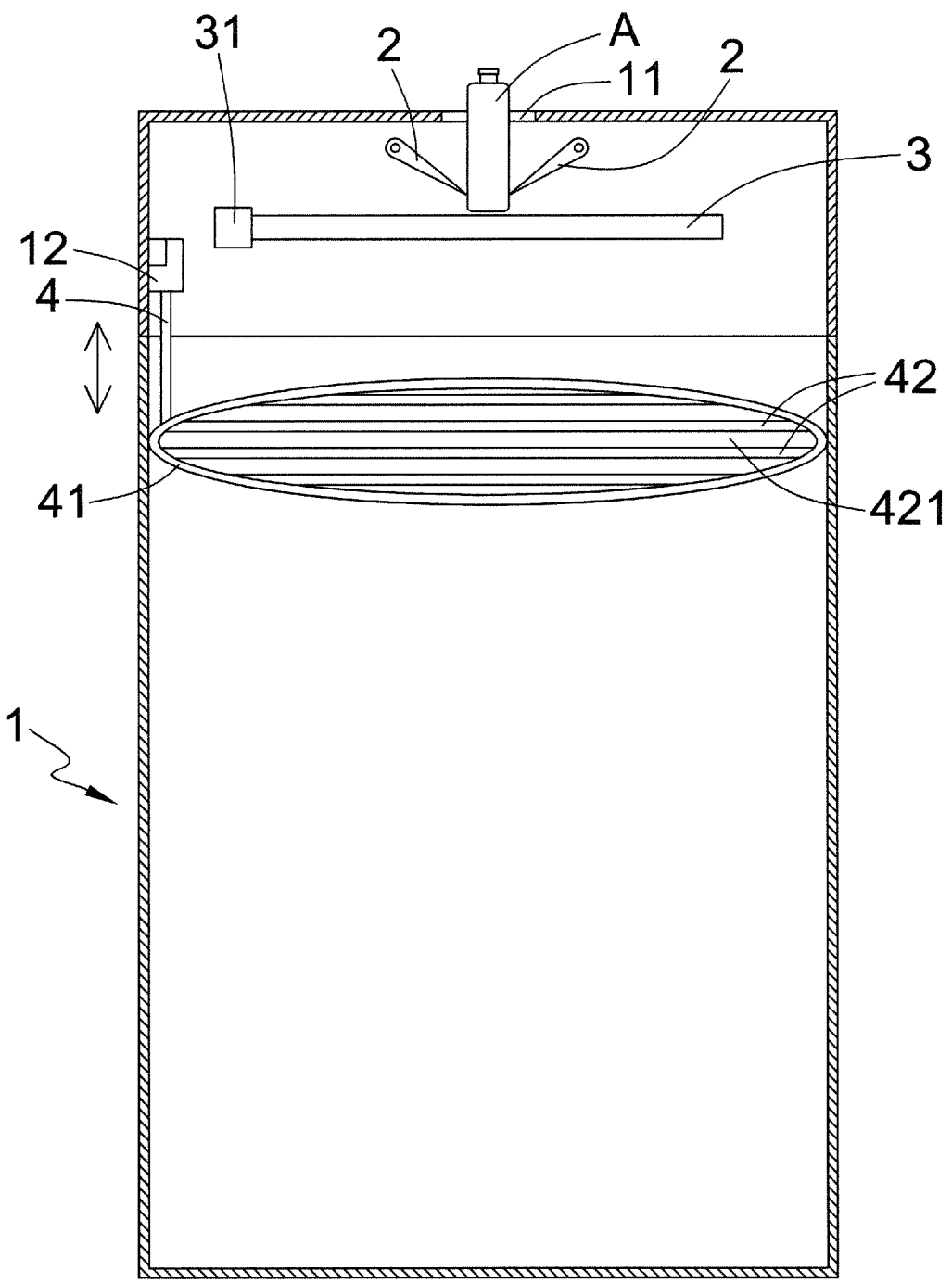
FIG. 3 shows a plastic material item being input and the direction of a telescopic push rod.
Figure 4:
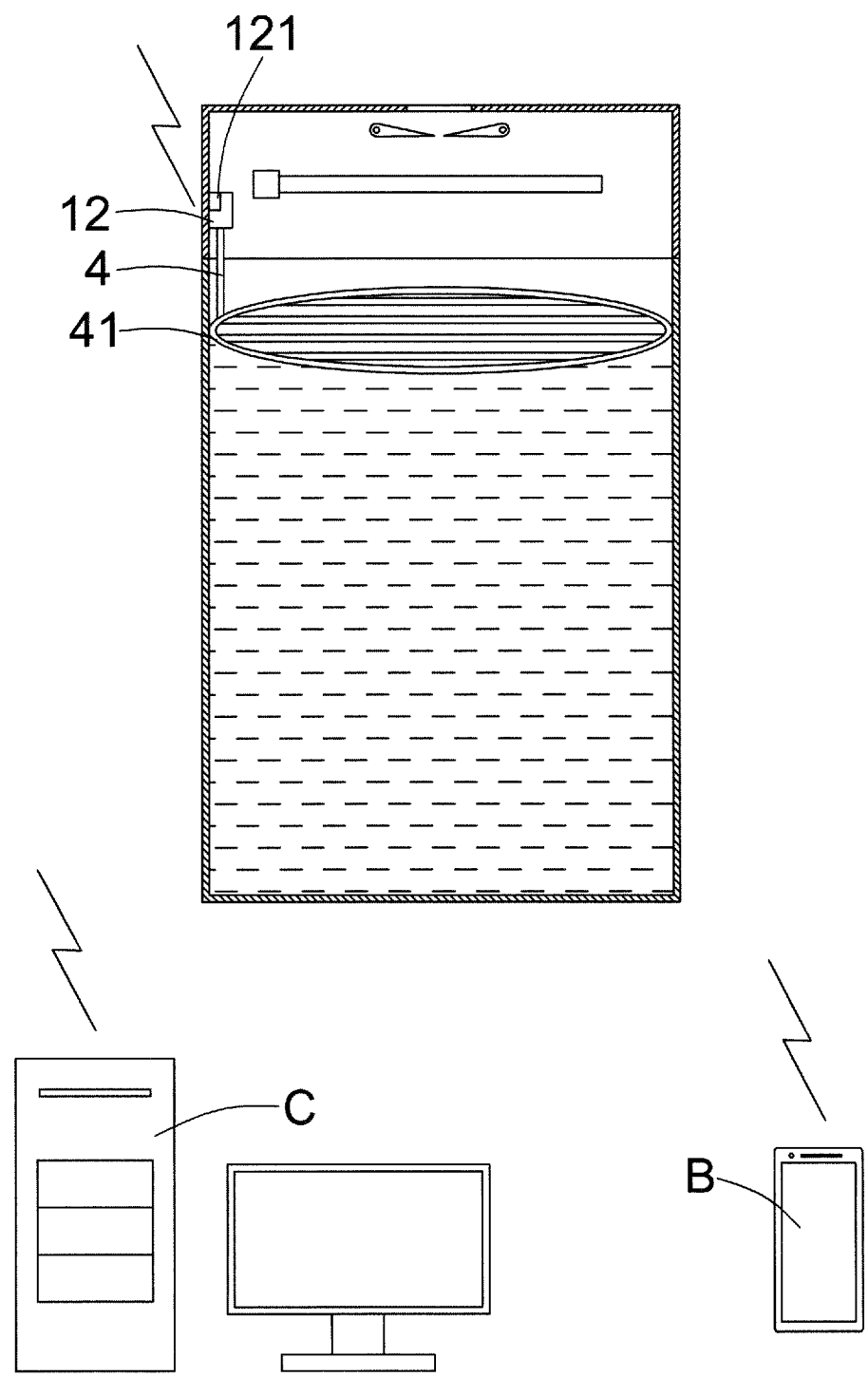
FIG. 4 shows the compressed crushed plastic material items being full and a signal being sent.
Figure 5:
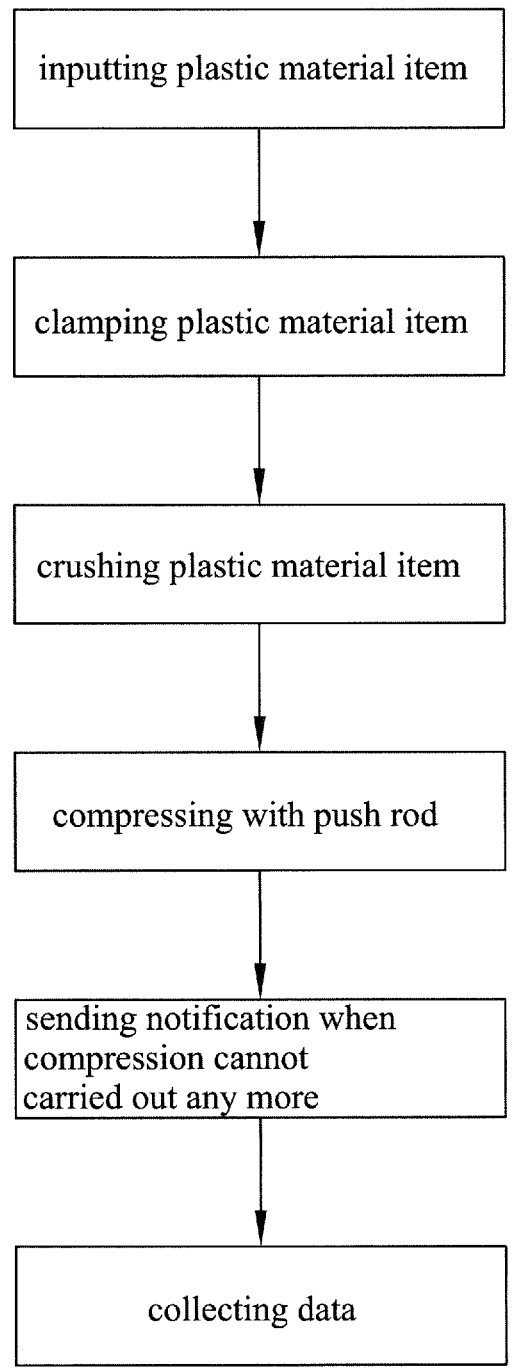
FIG. 5 is a flow chart of the present invention.

Referring to FIGS. 3 and 4, the plastic material item A is clamped by the pair of clamping seats 2 after input into the barrel 1 through the input hole 11 so as to prevent the plastic material item A from ejecting. Thereafter, the plastic material item A drops downward after crushed by the crushing device 3. With the compressing face 41 on the bottom of the telescopic push rod 4 provided with several strip supports 42 and the gap 421 arranged between each two adjacent strip supports 42, the crushed plastic material item A can drop downward to the bottom of the barrel 1. Next, the driving device 12 is caused to push the telescopic push rod 4 to make the compressing face 41 of the telescopic push rod 4 compress the crushed plastic material items A on the bottom of the barrel 1, thereby allowing the present invention to achieve the effects of crushing and compressing to reduce the volume occupied by the crushed plastic material items A on the bottom of the barrel 1. Finally, when the driving device 12 cannot carry out the compression any more, a notification will be sent to a smart device (e.g., smart phone B, APP, computer C, etc.) through the wireless transceiver module 121 inside the driving device 12 to notify recycling, thereby allowing the present invention to further achieve a notification effect. The operation steps of the present invention are shown in FIG. 5.

Furthermore, the present invention can upload the relevant data such as the removal time and frequency of the plastic material items A crushed into a full barrel to the background, thereby allowing a person with relevant authority to use a smart device such as smart phone B, APP or computer C to connect to the background on the Internet to receive or view relevant message data and other information in a unspecified location, which allows the present invention to have the effect of accessing statistics and analysis through remote network.

I claim:

1. A plastic material crushing and compacting structure, comprising:
   a barrel;
   an input hole is configured on an upper side of the barrel for inputting a plastic material item;
   at least one driving device positioned inside said barrel;
   a wireless transceiver module is provided inside said at least one driving device;
   a pair of clamping seats positioned below said input hole for preventing the input plastic material item from electing;
   a crushing device positioned below said pair of clamping seats for crushing the input plastic material item, and said crushing device is provided with a crushing device driver;
   a telescopic push rod positioned below said at least one driving device; and
   a compressing face is provided to a bottom of said telescopic push rod for compressing the crushed plastic material item on a bottom of the barrel, wherein a plurality strip supports on said compressing face, and a gap is arranged between each two adjacent strip supports, the crushed plastic material item can drop downward to the bottom of the barrel.

2. The plastic material crushing and compacting structure according to claim 1, wherein the plurality of strip support forming a plurality of gaps, and each of said gaps is the same size.

3. The plastic material crushing and compacting structure according to claim 1, wherein the plurality of strip support forming a plurality of gaps, and each of said gaps has different size.

4. The plastic material crushing and compacting structure according to claim 1, wherein said at least one driving device comprises two driving devices inside said barrel, said driving devices are paired and synchronized.

* * * * *